(12) United States Patent
Rasch et al.

(10) Patent No.: US 7,903,850 B2
(45) Date of Patent: Mar. 8, 2011

(54) METHOD AND APPARATUS FOR PRE-PROCESSING SCANS BY COMBINING ENHANCEMENT AND DENOISING AS A PREPARATION FOR SEGMENTING THE SAME

(75) Inventors: Matthias Rasch, Lonnerstadt (DE); Allen Keel, Baltimore, MD (US); Christine H Lorenz, Frederick, MD (US)

(73) Assignee: Siemens Medical Solutions USA, Inc., Malvern, PA (US)

( * ) Notice: Subject to any disclaimer, the term of this patent is extended or adjusted under 35 U.S.C. 154(b) by 910 days.

(21) Appl. No.: 11/488,802

(22) Filed: Jul. 18, 2006

(65) Prior Publication Data

US 2008/0144959 A1     Jun. 19, 2008

Related U.S. Application Data

(60) Provisional application No. 60/726,598, filed on Oct. 14, 2005.

(51) Int. Cl.
*G06K 9/00* (2006.01)
(52) U.S. Cl. ......... 382/128; 382/100; 382/173; 382/254; 382/263
(58) Field of Classification Search .......... 358/444–449, 358/403, 468; 382/276, 280, 128–134
See application file for complete search history.

(56) References Cited

U.S. PATENT DOCUMENTS

| | | | | |
|---|---|---|---|---|
| 5,488,674 A | * | 1/1996 | Burt et al. | 382/284 |
| 5,644,646 A | * | 7/1997 | Du et al. | 382/128 |
| 5,924,987 A | * | 7/1999 | Meaney et al. | 600/420 |
| 6,381,486 B1 | * | 4/2002 | Mistretta et al. | 600/420 |
| 2004/0071360 A1 | * | 4/2004 | Maurer | 382/254 |
| 2004/0071363 A1 | * | 4/2004 | Kouri et al. | 382/276 |

OTHER PUBLICATIONS

Semmlow et al. Biosignal and Biomedical Image Processing: MATLAB-Based Applications, CRC, 1st edition, Jan. 14, 2004, Chapters 11-12.*
Lehmann et al., "Survey: Interpolation Methods", Nov. 1999, IEEE Transactions on Medical Imaging, vol. 18, No. 11, pp. 1049-1075.*
Smith et al., "Efficient algorithms for generating interpolated (zoomed) MR images", 1988, Proceedings of the International Society for Magnetic Resonance in Medicine, vol. 7 (2), pp. 156-171.*
Joliot et al.,"Three-Dimensional Segmentation and Interpolation of Magnetic Resonance Brain Images", Jun. 1993, IEEE Transactions on Medical Imaging, vol. 12, No. 2, pp. 269-277.*
Benoit-Cattin et al., "3D medical image coding using separable 3D wavelet decomposition and lattice vector quantization" 1997, Elsevier Science: Signal Processing, vol. 59, pp. 139-153.*

(Continued)

*Primary Examiner* — Sath V Perungavoor
*Assistant Examiner* — Jason Heidemann
(74) *Attorney, Agent, or Firm* — Donald B. Paschburg; F. Chau & Associates, LLC

(57) ABSTRACT

A computer-implemented method for pre-processing image data of a three-dimensional volume includes providing the image data of a vessel, applying a super-sampling filter to the image data to generate super-sampled image data having an increased resolution as compared to the image data, applying an unsharp masking filter to the super-sampled image data for increasing contrast of an edge of the vessel, applying a de-noising filer for removing noise surrounding the edge after applying the unsharp masking filter, and storing the image data after applying the de-noising filter thereto.

13 Claims, 6 Drawing Sheets

OTHER PUBLICATIONS

Westenberg et al., "An Extension of Fourier-Wavelet Volume Rendering by View Interpolation", 2001, Journal of Mathematical Imaging and Vision, Issue 14, pp. 103-115.*

Song et al., Interpolation of CT Slices for 3-D Visualization by Maximum Intensity Projections, 2002 PCM 2002, LNCS 2532, pp. 1065-1072, 2002. Springer-Verlag Berlin Heidelberg.*

Sheppard et al. (Techniques for image enhancement and segmentation of tomographic images of porous materials, Physica A: Statistical Mechanics and its Applications, vol. 339, Issues 1-2, Aug. 1, 2004, pp. 145-151, Proceedings of the International Conference New Materials and Complexity).*

Laine et al. ( "Enhancement by Multiscale Nonlinear Operators", Chapter 3: Handbook of Medical Imaging, 1st edition, Oct. 13, 2000 pp. 33-53).*

* cited by examiner

US 7,903,850 B2

METHOD AND APPARATUS FOR PRE-PROCESSING SCANS BY COMBINING ENHANCEMENT AND DENOISING AS A PREPARATION FOR SEGMENTING THE SAME

CROSS-REFERENCE TO RELATED APPLICATIONS

This application claims the benefit of Provisional Application No. 60/726,598 filed on Oct. 14, 2005 in the United States Patent and Trademark Office, the contents of which are herein incorporated by reference in its entirety.

BACKGROUND OF THE INVENTION

1. Field of the Invention

The present disclosure relates to image processing, and more particularly to a system and method for pre-processing scans as a preparation for segmentation.

2. Description of Related Art

Computed Tomography (CT) has dominated the area of noninvasive coronary imaging, in part due to the ability to segment and visualize the coronaries automatically form high resolution, high contrast-to-noise CT data. However, an equivalent in Magnetic Resonance (MR) datasets is very difficult due to the inherent qualities of MR images: lower contrast, lower spatial resolution, and more noise, including motion.

Therefore, a need exists for a system and method for pre-processing MR scans as a preparation for segmentation

SUMMARY OF THE INVENTION

According to an embodiment of the present disclosure, a computer-implemented method for pre-processing image data of a three-dimensional volume includes providing the image data of a vessel, applying a super-sampling filter to the image data to generate super-sampled image data having an increased resolution as compared to the image data, applying an unsharp masking filter to the super-sampled image data for increasing contrast of an edge of the vessel, applying a de-noising filer for removing noise surrounding the edge after applying the unsharp masking filter, and storing the image data after applying the de-noising filter thereto.

Applying the super-sampling filter comprises upsampling the image data for increasing the resolution of the image data, determining a Fourier transform of the image data after upsampling, applying a low-pass filter to the Fourier transform, multiplying voxel values of the image data by a Fourier gain after applying the low-pass filter, applying an inverse Fourier transform (FT) to the image data to determine an interpolated image after multiplying voxel values, and outputting the interpolated image.

Upsampling comprises inserting a zero value between each pair of adjacent voxels of the image data.

Applying the unsharp masking filter comprises filtering the image data by:

$$\frac{1}{(\alpha+1)} \begin{bmatrix} -\alpha & \alpha-1 & -\alpha \\ \alpha-1 & \alpha+5 & \alpha-1 \\ -\alpha & \alpha-1 & -\alpha \end{bmatrix}$$

where a negative of a Laplacian filter α controls a shape of the Laplacian, with a default α=0.2.

The de-noising filter is edge-preserving.

The method further includes segmenting stored image data.

According to an embodiment of the present disclosure, a program storage device is provided readable by machine, tangibly embodying a program of instructions executable by the machine to perform method steps for pre-processing image data of a three-dimensional volume. The method steps include providing the image data of a vessel, applying a super-sampling filter to the image data to generate super-sampled image data having an increased resolution as compared to the image data, applying an unsharp masking filter to the super-sampled image data for increasing contrast of an edge of the vessel, applying a de-noising filer for removing noise surrounding the edge after applying the unsharp masking filter, and storing the image data after applying the de-noising filter thereto.

According to an embodiment of the present disclosure, a computer-implemented method for pre-processing Magnetic Resonance (MR) image data includes providing the MR image data, super-sampling the MR image data to generate super-sampled MR image data, increasing contrast of an edge in the super-sampled MR image data, removing noise about the edge to generate pre-processed MR image data, and segmenting the pre-processed MR image data.

Super-sampling includes upsampling the MR image data for increasing a resolution of the image data, determining a Fourier transform of the MR image data after upsampling, applying a low-pass filter to the Fourier transform, multiplying voxel values of the MR image data by a Fourier gain after applying the low-pass filter, applying an inverse Fourier transform (FT) to the MR image data to determine an interpolated image after multiplying voxel values, and outputting the interpolated image, wherein the interpolated image is the super-sampled MR image data.

BRIEF DESCRIPTION OF THE DRAWINGS

Preferred embodiments of the present invention will be described below in more detail, with reference to the accompanying drawings.

DETAILED DESCRIPTION OF PREFERRED EMBODIMENTS

Segmentation of Magnetic Resonance Imaging (MRI) scans of coronary arteries is made difficult by low contrast, high noise, and low resolution conditions typically associated with the MRI scans. To improve segmentation results, according to an embodiment of the present disclosure, a set of filters is applied to the MRI scans for pre-processing before segmentation.

According to an embodiment of the present disclosure, an optimized pre-processing method substantially improves MRI scans for use in segmentation, and provides a basis for semi-automatic segmentation of the coronary tree in MR. User interaction is also minimized, reducing the number of seed points needed. Pre-processing filters are implemented, which run sequentially on the MRI data for improving segmentation.

Figure 1:
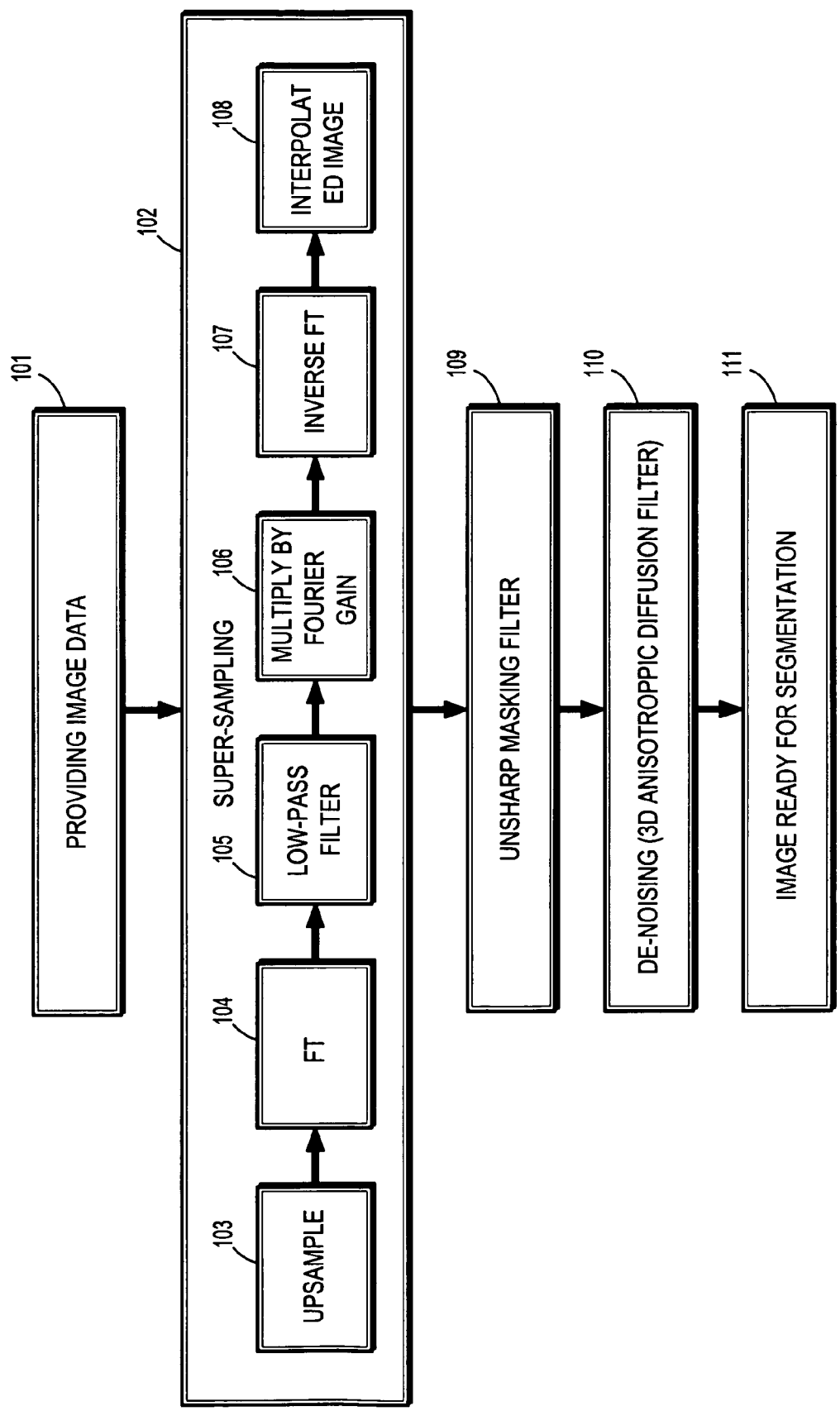
FIG. 1 illustrates a method for pre-processing scan images, according to an embodiment of the present disclosure.

Referring to FIG. 1, according to an embodiment of the present disclosure, a method for pre-processing provided image data 101 implements a pre-processing pipeline including, sequentially, a super-sampling 102, an unsharp masking filter 109, and a de-noising filter 110.

In MRI, the diameter of the coronary vessel can be as low as 2 pixels in basal slices. Super-sampling 102 to a higher resolution adds more pixels and facilitates front propagation throughout the entire artery. The unsharp masking filter 109 enhances the edges of the vessel to substantially prevent leaking. De-noising 110 is performed by using a 3D anisotropic diffusion filter for removing the noise surrounding the vessel.

The resulting image can then be processed by a segmentation method 111. The results of the segmentation method include a vessel centerline, which can then be used to navigate the original data.

Referring to the super-sampling 102; super-sampling 102 comprises upsampling 103, a Fourier transform (FT) 104, a low-pass filter 105, multiplication by a Fourier gain 106, an inverse Fourier transform 107, and outputting an interpolated image 108.

Upsampling 103 includes inserting a zero value between each pair of voxels of the image data, thereby increasing a resolution of the image. A Fourier transform in applied to upsampled image data. The low-pass filter 105 is applied to a Fourier transform of the image data. The image data output by the low-pass filter is multiplied by a gain (e.g., 8) to increase brightness. The image is resorted by inverse Fourier transform. The interpolated image, the output of the inverse Fourier transform, is output 108 to the unsharp masking filter 109.

Referring to the unsharp masking filter 109; the filter may be expressed as:

$$\frac{1}{(\alpha+1)}\begin{bmatrix} -\alpha & \alpha-1 & -\alpha \\ \alpha-1 & \alpha+5 & \alpha-1 \\ -\alpha & \alpha-1 & -\alpha \end{bmatrix}$$

such that, a negative of the Laplacian filter $\alpha$ controls the shape of the Laplacian, with a default $\alpha=0.2$.

Referring to the de-noising filter 110; the de-noising filter 110 detects edges and interpolates along the edges. The de-noising filter 110 is edge-preserving, e.g., the de-noising filter 110 does not interpolate across the edges. One of ordinary skill in the art would recognize that various de-noising filters may be implemented.

Experiments implementing a method according to an embodiment of the present disclosure used five datasets (n=5), which were navigator gated, axial whole-heart coronary MR scans acquired using a TrueFISP pulse sequence, using T2-preparation, on a Siemens 1.5T Avanto® scanner. The parameters were FOV/Matrix=190×320, TR/TE=3.9/1.5 ms, Flip angle=90, 120 slices, 1 mm thick, TA=10:10 mins.

Figure 2A:
FIGS. 2A-B are original segmentations of a coronary tree.
Figure 2B:
Figure 2C:
FIG. 2C-D are post-processing images of the coronary tree of FIGS. 2A-B; according to an embodiment of the present disclosure.
Figure 2D:
Figure 3A:
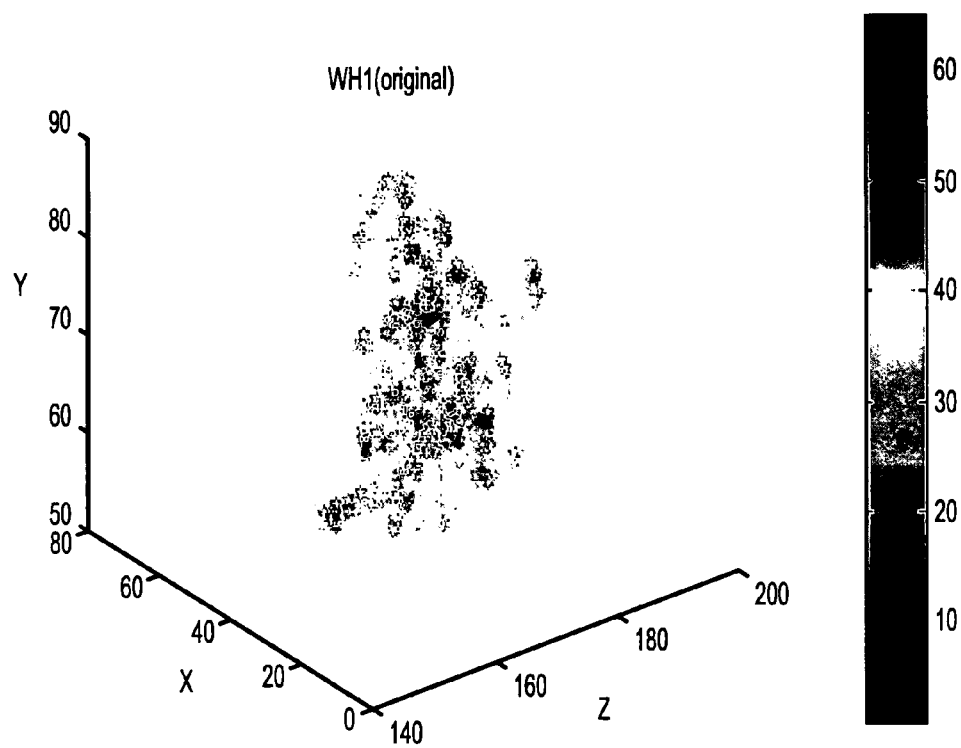
FIGS. 3A-C are graphs of a segmentation without pre-processing.
Figure 3B:
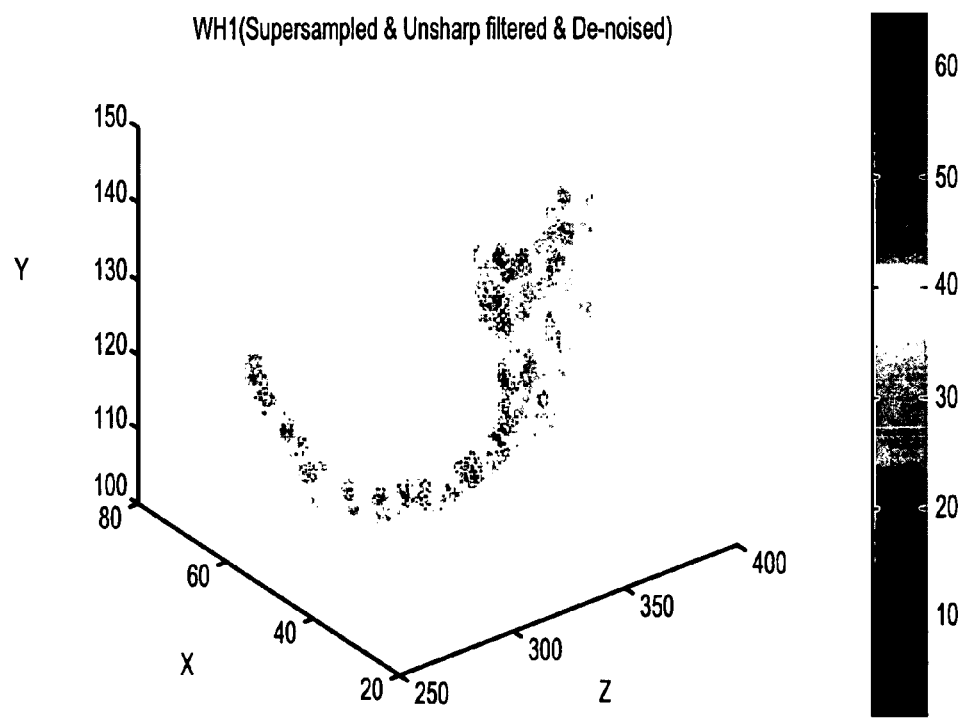
Figure 3C:
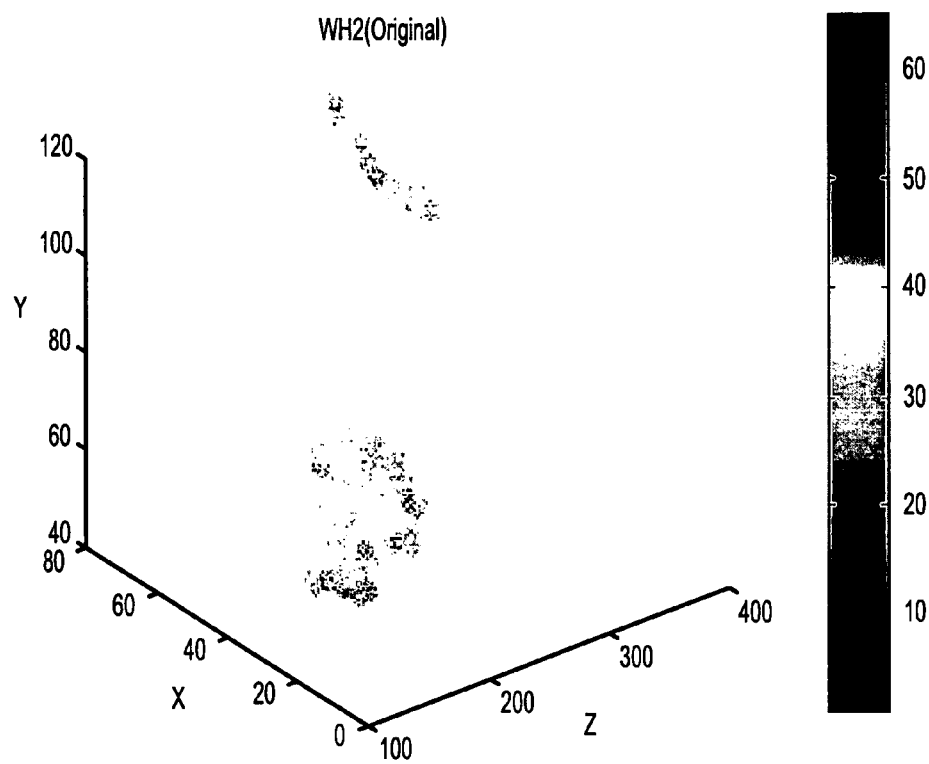
Figure 3D:
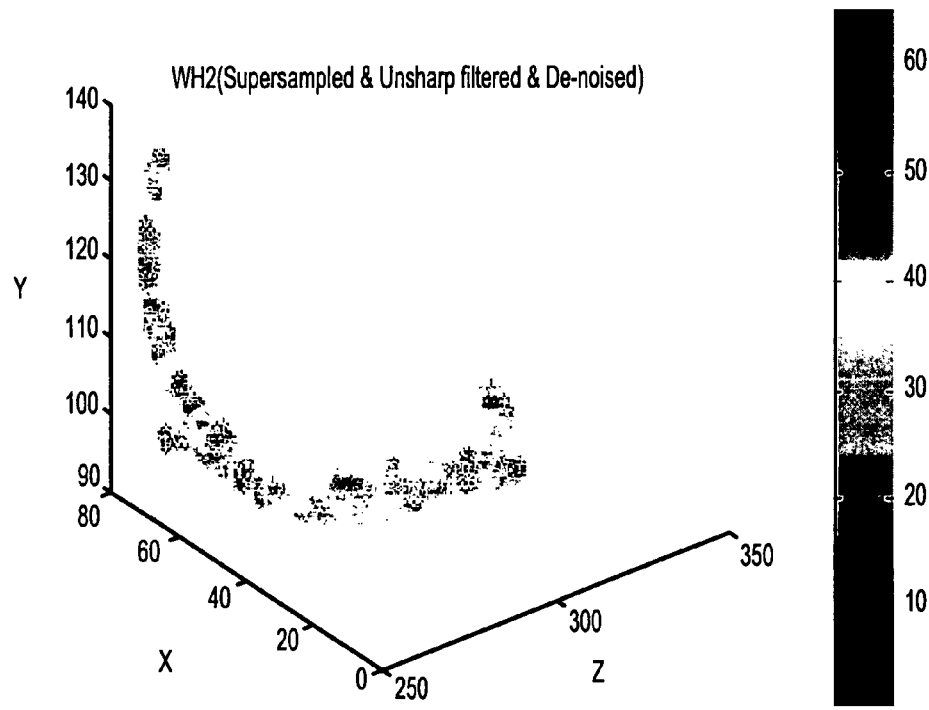
FIGS. 3D-F are graphs of the segmentation of FIGS. 3A-C with post-processing, according to an embodiment of the present disclosure.
Figure 3E:
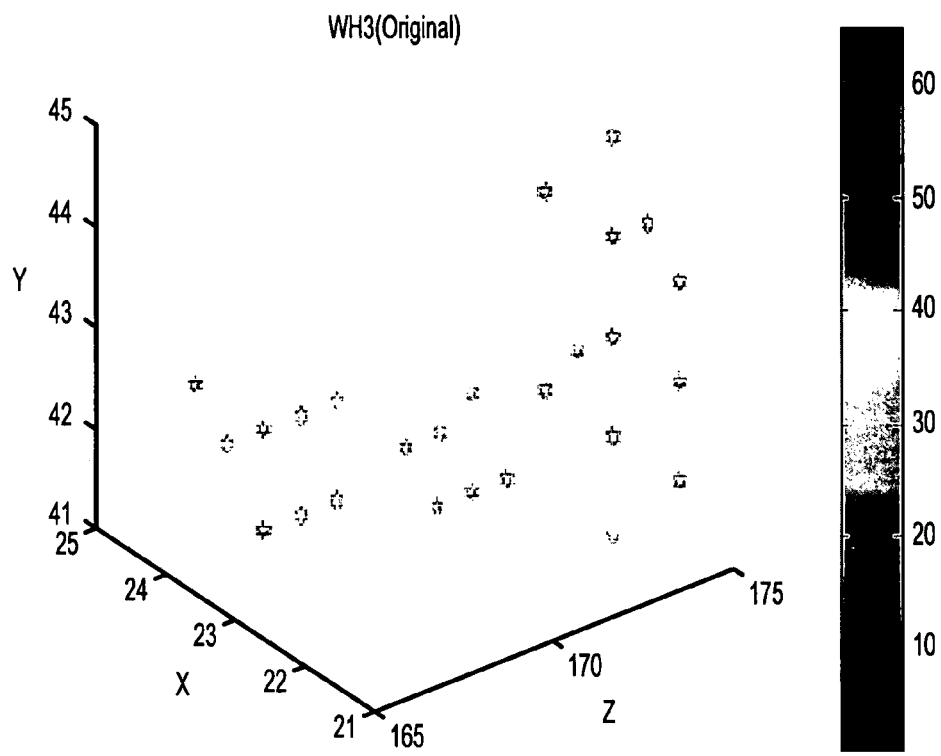
Figure 3F:
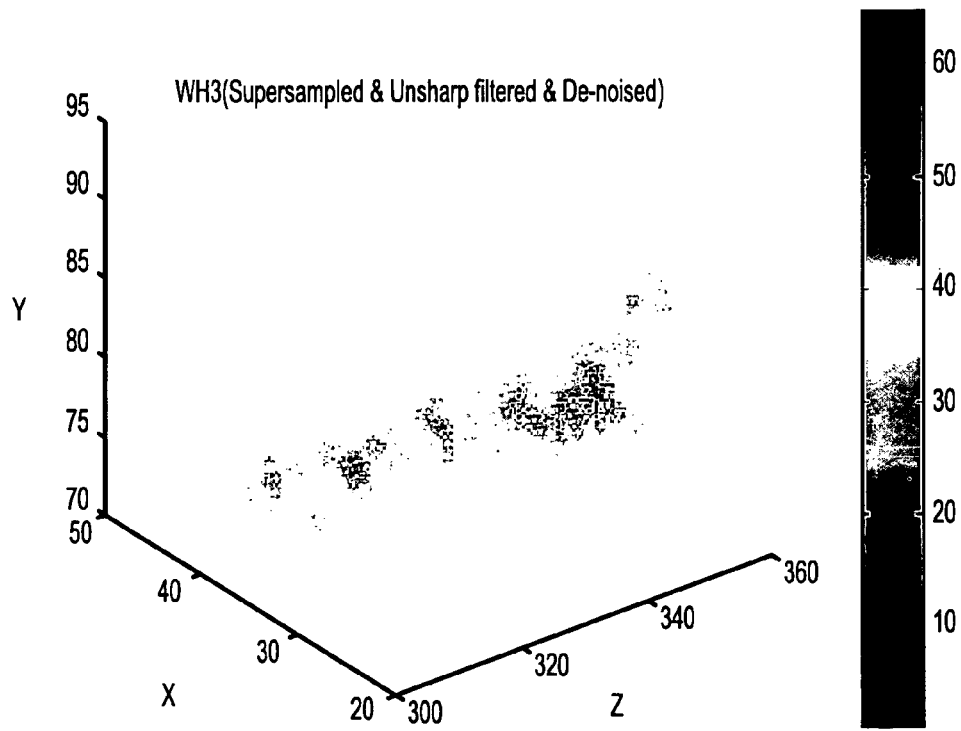

For each dataset, the centerline coordinates of the vessel were overlaid on a volume-rendered image, for example, see FIGS. 2A-D, wherein FIGS. 2A and 2C are original images and FIGS. 2B and 2D are pre-processed images. In addition to substantially eliminating boundary leakage out of the vessel, the pre-processing increased the through-plane (apex-to-base) RCA (right coronary artery) propagation by an average of ~400% (see also FIGS. 3A-F), all with just a single seed-point. FIGS. 3A, 3C, and 3E show a segmentation of an RCA without pre-processing. FIGS. 3B, 3D, and 3F show a segmentation of an RCA with pre-processing according to an embodiment of the present disclosure.

Although the LCA (left coronary artery) and LCX (left circumflex artery) needed roughly 5 to 7 seedpoints, combined, to track through all the branching, segmentation error was minimal.

According to an embodiment of the present disclosure, pre-processing the MR images prior to segmentation improves segmentation results. In each of the five datasets, the RCA was successfully segmented with only one user-defined seedpoint. Overall, the pre-processing increased the CNR (contrast-to-noise ratio) and the spatial resolution of the MR volumes, as a positive step toward fully satisfying the challenge of the coronary segmentation in MR.

Referring to block 111 and image segmentation; for an exemplary segmentation of the coronary arteries, a multi-layered fast-marching method may be employed. The method can be divided into three hierarchical levels, each comprised of interchangeable sub-methods: the Voxel level, the Segment level, and the Tree level.

At the Voxel level, two scores are determined, including a multiscale vesselness measure and a gray-level statistics score. The multiscale vesselness measure represents the geometric similarity to a tubular shape, and is determined according to the second-order variations of the Hessian matrix. The gray-level statistics score is determined based on an adaptive estimation of the intensity distribution in the vessel. The weight parameters yielding the optimal segmentation results for MR are found. After multiplication by the weights, these two scores are summed, and a combined score $s(p)[0 \rightarrow 1]$ is determined. If the combined score is above a threshold T, then the voxel is accepted into the segmentation.

The Segment level partitions the segmentation mask into representative units, using shape analysis.

At the Tree level, arterial branching points are detected and the actual tree structure of the arterial tree is reflected.

One of ordinary skill in the art would appreciate that other segmentations may be applied to the pre-processed image data according to an embodiment of the present disclosure.

It is to be understood that the present invention may be implemented in various forms of hardware, software, firmware, special purpose processors, or a combination thereof. In one embodiment, the present invention may be implemented in software as an application program tangibly embodied on a program storage device. The application program may be uploaded to, and executed by, a machine comprising any suitable architecture.

Figure 4:
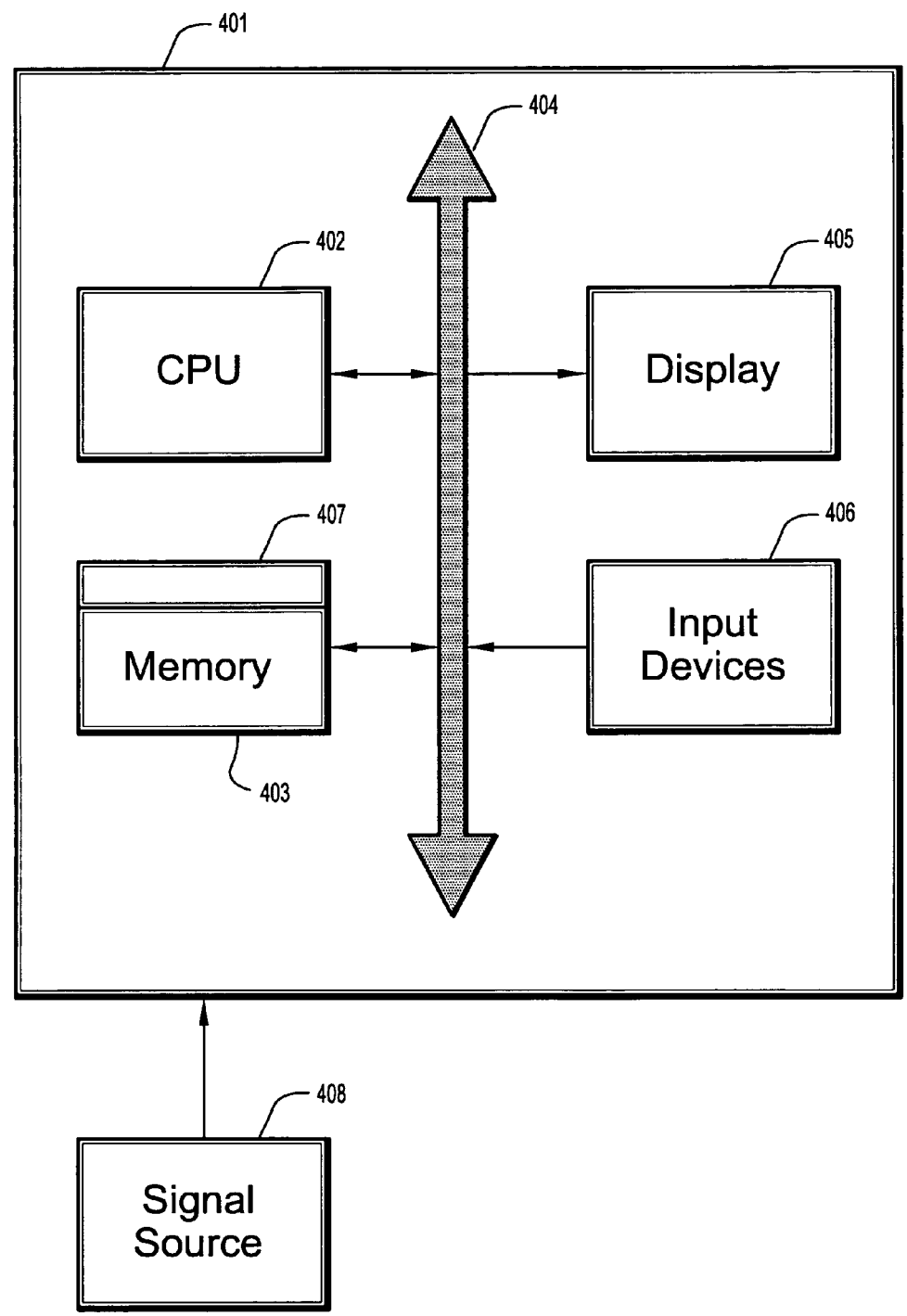
FIG. 4 is a diagram of a system for performing a method for pre-processing scan images, according to an embodiment of the present disclosure.

Referring to FIG. 4, according to an embodiment of the present disclosure, a computer system 401 for pre-processing scans as a preparation for segmentation can comprise, inter alia, a central processing unit (CPU) 402, a memory 403 and an input/output (I/O) interface 404. The computer system 401 is generally coupled through the I/O interface 404 to a display 405 and various input devices 406 such as a mouse and keyboard. The support circuits can include circuits such as cache, power supplies, clock circuits, and a communications bus. The memory 403 can include random access memory (RAM), read only memory (ROM), disk drive, tape drive, etc., or a combination thereof. The present invention can be implemented as a routine 407 that is stored in memory 403 and executed by the CPU 402 to process the signal from the signal source 408. As such, the computer system 401 is a general-purpose computer system that becomes a specific purpose computer system when executing the routine 407 of the present invention.

The computer platform 401 also includes an operating system and microinstruction code. The various processes and functions described herein may either be part of the microinstruction code or part of the application program (or a combination thereof), which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the present invention is programmed. Given the teachings of the present disclosure provided herein, one of ordinary skill in the related art will be able to contemplate these and similar implementations or configurations.

Having described embodiments for a system and method for pre-processing scans as a preparation for segmentation, it is noted that modifications and variations can be made by persons skilled in the art in light of the above teachings. It is therefore to be understood that changes may be made in embodiments of the present disclosure that are within the scope and spirit thereof.

What is claimed is:

1. A non-transitory computer-implemented method for pre-processing image data of a three-dimensional volume comprising:
    capturing the image data representing a vessel by a Magnetic Resonance (MR) scanner;
    applying a super-sampling filter to the image data to generate super-sampled image data having an increased resolution as compared to the image data;
    applying an unsharp masking filter to the super-sampled image data for increasing contrast of an edge of the vessel;
    applying a de-noising filter for removing noise surrounding the edge after applying the unsharp masking filter; and
    storing the image data after applying the de-noising filter thereto.

2. The computer-implemented method of claim 1, wherein applying the super-sampling filter comprises:
    upsampling the image data for increasing the resolution of the image data;
    determining a Fourier transform of the image data after upsampling;
    applying a low-pass filter to the Fourier transform;
    multiplying voxel values of the image data by a Fourier gain after applying the low-pass filter;
    applying an inverse Fourier transform (FT) to the image data to determine an interpolated image after multiplying voxel values; and
    outputting the interpolated image, wherein the interpolated image is the super-sampled image data.

3. The computer-implemented method of claim 2, wherein upsampling comprises inserting a zero value between each pair of adjacent voxels of the image data.

4. The computer-implemented method of claim 1, wherein applying the unsharp masking filter comprises filtering the image data by:

$$\frac{1}{(\alpha+1)} \begin{bmatrix} -\alpha & \alpha-1 & -\alpha \\ \alpha-1 & \alpha+5 & \alpha-1 \\ -\alpha & \alpha-1 & -\alpha \end{bmatrix}$$

where a negative of a Laplacian filter $\alpha$ controls a shape of a Laplacian, with a default $\alpha=0.2$.

5. The computer-implemented method of claim 1, wherein the de-noising filter is edge-preserving.

6. The computer-implemented method of claim 1 further comprising segmenting stored image data.

7. A non-transitory computer readable medium embodying a program of instructions executable by a processor to perform method steps for pre-processing image data of a three-dimensional volume, the method steps comprising:
    providing the image data of a vessel;
    applying a super-sampling filter to the image data to generate super-sampled image data having an increased resolution as compared to the image data;
    applying an unsharp masking filter to the super-sampled image data for increasing contrast of an edge of the vessel;
    applying a de-noising filter for removing noise surrounding the edge after applying the unsharp masking filter; and
    storing the image data after applying the de-noising filter thereto.

8. The computer readable medium of claim 7, wherein applying the super-sampling filter comprises:
    upsampling the image data for increasing the resolution of the image data; determining a Fourier transform of the image data after upsampling;
    applying a low-pass filter to the Fourier transform;
    multiplying voxel values of the image data by a Fourier gain after applying the low-pass filter;
    applying an inverse Fourier transform (FT) to the image data to determine an interpolated image after multiplying voxel values; and
    outputting the interpolated image, wherein the interpolated image is the super-sampled image data.

9. The computer readable medium of claim 8, wherein upsampling comprises inserting a zero value between each pair of adjacent voxels of the image data.

10. The computer readable medium of claim 7, wherein applying the unsharp masking filter comprises filtering the image data by:

$$\frac{1}{(\alpha+1)} \begin{bmatrix} -\alpha & \alpha-1 & -\alpha \\ \alpha-1 & \alpha+5 & \alpha-1 \\ -\alpha & \alpha-1 & -\alpha \end{bmatrix}$$

where a negative of a Laplacian filter $\alpha$ controls a shape of a Laplacian, with a default $\alpha=0.2$.

11. The computer readable medium of claim 7, wherein the de-noising filter is edge-preserving.

12. The computer readable medium of claim 7, further comprising segmenting stored image data.

13. A computer-implemented method for pre-processing Magnetic Resonance (MR) image data comprising:
    capturing the MR image data representing a vessel by an MR scanner;
    super-sampling the MR image data to generate super-sampled MR image data, wherein super-sampling comprises:

upsampling the MR image data by inserting a zero value between each pair of voxels of the MR image data;
determining a Fourier transform of the MR image data after upsampling;
applying a low-pass filter to the Fourier transform;
multiplying voxel values of the MR image data by a gain after applying the low-pass filter;
applying an inverse Fourier transform (FT) to the MR image data to determine an interpolated image after multiplying voxel values; and outputting the interpolated image, wherein the interpolated image is the super-sampled MR image data;
increasing contrast of an edge of the vessel in the super-sampled MR image data;
removing noise about the edge of the vessel, without interpolating across the edge of the vessel, to generate pre-processed MR image data; and
segmenting the pre-processed MR image data.

* * * * *